United States Patent [19]

Ueda

[11] Patent Number: 5,801,775
[45] Date of Patent: Sep. 1, 1998

[54] MOVING PICTURE COMPRESSION USING CACHE MEMORY FOR STORING CODING INSTRUCTIONS

[75] Inventor: Hiroaki Ueda, Tokyo, Japan

[73] Assignee: NEC Corporation, Tokyo, Japan

[21] Appl. No.: 682,315

[22] Filed: Jul. 17, 1996

[30] Foreign Application Priority Data

Jul. 17, 1995 [JP] Japan ............................ 7-179756

[51] Int. Cl.$^6$ ............................................ H04N 7/32
[52] U.S. Cl. ................................. 348/402; 348/416
[58] Field of Search ........................ 348/416, 415, 348/409, 402, 401, 400, 390, 384; 364/715.02; 382/238, 236, 232; H04N 7/137

[56] References Cited

U.S. PATENT DOCUMENTS

| | | | |
|---|---|---|---|
| 5,095,512 | 3/1992 | Roberts et al. ........................ 382/245 |
| 5,317,397 | 5/1994 | Odaka et al. .......................... 348/416 |
| 5,408,542 | 4/1995 | Callahan ................................ 382/244 |
| 5,612,747 | 3/1997 | Hartung et al. ....................... 348/418 |

FOREIGN PATENT DOCUMENTS

| | | |
|---|---|---|
| 57-141756 | 9/1982 | Japan . |
| 58-176752 | 10/1983 | Japan . |
| 62-125449 | 6/1987 | Japan . |
| 4-333929 | 11/1992 | Japan . |

*Primary Examiner*—Bryan Tung
*Attorney, Agent, or Firm*—Foley & Lardner

[57] ABSTRACT

Processing of picture image compression coding is divided into a plurality of processing steps and programs for the respective steps are stored in a memory. Based on capacity of the memory, at least one of a number of frames, a number of lines and a number of block lines is set as a division unit by which each step conducts processing. Processing corresponding to a program stored in the memory is executed for a set division unit.

18 Claims, 13 Drawing Sheets

PRIOR ART
FIG1. A
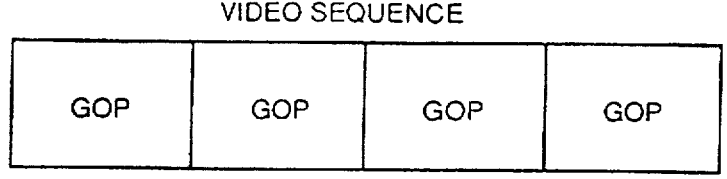
FIG1. B
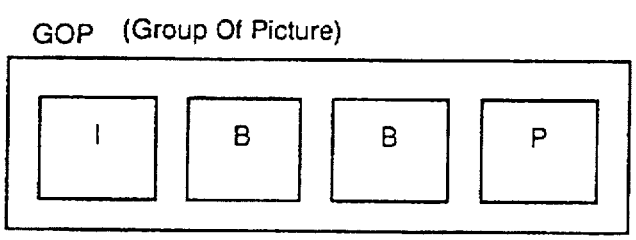
FIG1. C
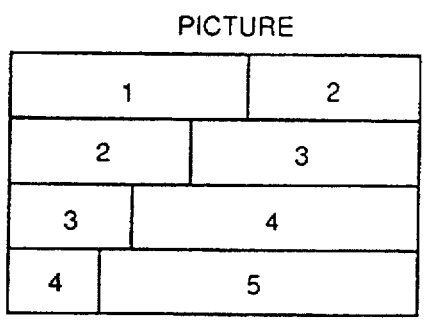
FIG1. D
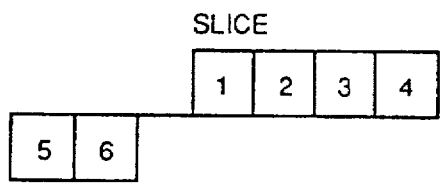
FIG1. E
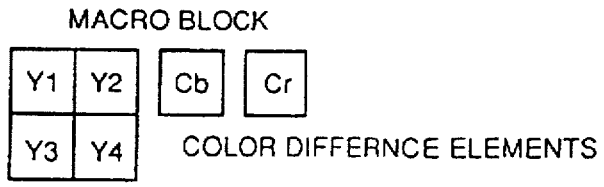
FIG1. F

PRIOR ART
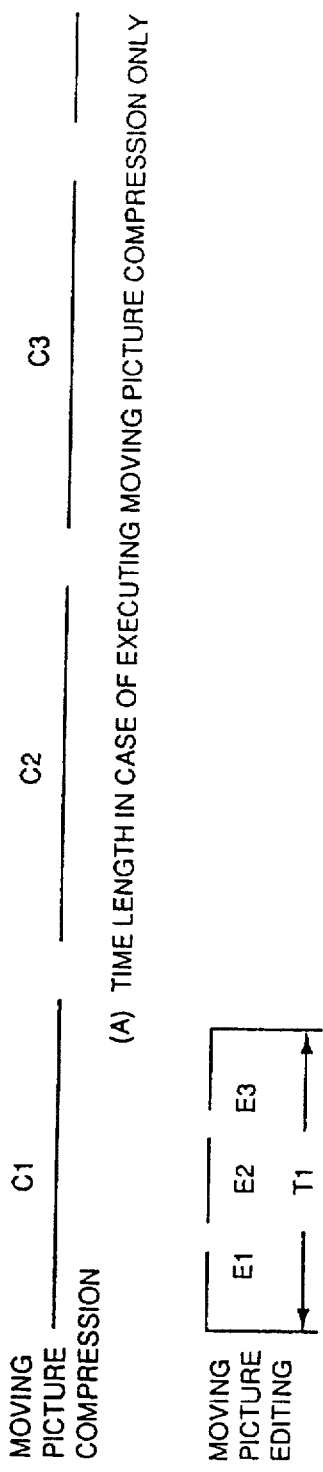
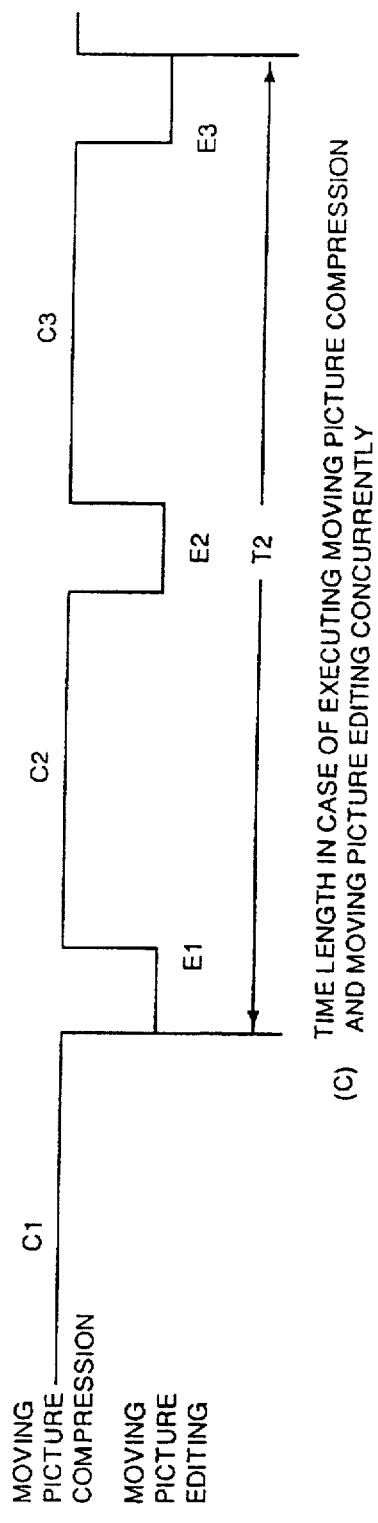
FIG. 3A (A) TIME LENGTH IN CASE OF EXECUTING MOVING PICTURE COMPRESSION ONLY
FIG. 3B (B) TIME LENGTH IN CASE OF EXECUTING MOVING PICTURE EDITING ONLY
FIG. 3C (C) TIME LENGTH IN CASE OF EXECUTING MOVING PICTURE COMPRESSION AND MOVING PICTURE EDITING CONCURRENTLY

FIG.7

| NUMBER OF PROGRAMS UNDER EXECUTION | DIVISION UNIT OF YCrCb CONVERSION (LINE) | DIVISION UNIT OF MOVEMENT SEARCH (BLOCK LINE) | DIVISION UNIT OF FRAME COMPRESSION (BLOCK LINE) |
|---|---|---|---|
| 1 | 200 | 20 | 30 |
| 2 | 100 | 10 | 15 |
| 3 | 50 | 5 | 8 |

MOVING PICTURE COMPRESSION USING CACHE MEMORY FOR STORING CODING INSTRUCTIONS

BACKGROUND OF THE INVENTION

This invention relates to a unit for compression coding a picture code with a coding mode (Joint Photographic Expert Group or Moving Pictures Expert Group) based on a Discrete Cosine Transformation (referred to as DCT, hereinafter)

In order to record a picture image on a recording medium such as a CD-ROM or a hard disc, the picture image should be digitized. The size of the digitized data becomes so large that they are generally compression coded for recording.

Among various compression coding modes, a DCT-based coding mode has been increasingly employed. This mode takes advantages of a feature that spatial frequency of the picture image is likely to concentrate in the low frequency range. This mode has been used as the coding mode of International Standards such as JPEG (Joint Photographic Expert Group (referred to JPEG, hereinafter) Moving Pictures Expert Group (referred to MPEG, hereinafter) or the like.

FIG. 1A to FIG. 1F show each layer of the code format according to the MPEG. The MPEG code is formed of a plurality of layers as shown in FIG. 1A. FIG. 1A shows a top layer as a video sequence, which comprises a plurality of Group of Pictures (referred to GOPs, hereinafter).

As FIG. 1B shows, the GOP comprises a plurality of pictures. Each picture corresponds to the respective picture image. The picture is formed of 3 types of pictures, a picture I as an in-frame code, a picture P as a forward inter-frame code and a picture B as a bidirectional inter-frame code. As FIG. 1C shows, the picture comprises a plurality of slices which have been separated into a certain number of regions. The slice comprises a plurality of macro blocks which are arranged from left to right or from top to bottom. As FIG. 1E shows, the macro block comprises 6 blocks containing 4 luminance elements (Y1, Y2, Y3 and Y4) and 2 color difference elements (Cb and Cr). Each luminance element is a block of 8×8 dot obtained by dividing a 16×16 dot block. Each color difference element is a block of 8×8 dot corresponding to the region of the luminance element. The block of 8×8 dot is a minimum unit of this coding mode.

Described is a picture code compression through a conventional coding mode based on the DCT by taking the MPEG as an example. FIG. 2 is a block diagram of a moving picture compression unit for compressing the picture code conforming to the MPEG.

The moving picture compression unit of FIG. 2 comprises YCrCb conversion means 3 by which a picture image is read and a composite color TV signal is divided into a luminance signal Y and two color signals Cr and Cb for outputting, motion search means 4 for searching each motion of pictures in past/future frames and in the current frame at every 8×8 block region, and frame compression means 5 for executing compression coding of the data.

The picture of the MPEG is divided into 3 types, a picture I as an in-frame code, a picture P as a forward inter-frame code and a picture B as a bidirectional inter-frame code. Therefore the frame compression means 5 executes 3 types of compressions.

Next, each operation is explained.

In case of compressing the picture I, a picture element value in the 8×8 block region of the current frame is discrete cosine transformed by DCT means 7. The transformation result is quantized by quantization means 8. The quantized data are high efficiency compressed to Haffman variable length codes by a variable length coding (VLC) means 9. In order to decode the compressed picture image to a reference frame, the quantized data are inverse quantized by an inverse quantization means 13 and inverse discrete cosine transformed to calculate a picture element value. The resultant value is stored in a reference frame means 10.

In case of compressing the picture P, a motion estimate means 6 calculates a difference between a picture element value of the 8×8 block region of the current frame and the picture element value of the 8×8 block region of the past frame stored in the reference frame means 10, which is referenced by the motion searched by the motion search means 4. The calculated difference value is discrete cosine transformed by the DCT means 7, quantized by the quantization means 8. The quantized data are high efficiency compressed to Haffman variable length codes by the VLC means 9. In order to decode the compressed picture image to a reference frame, the quantized data are inverse quantized by the inverse quantization means 13 and inverse discrete cosine transformed to calculate a difference value by the IDCT means 12. Then motion compensation means 11 adds the difference value to the picture element value of the 8×8 block in the past frame which has been stored in the reference frame means 10 referenced by the motion estimate means 6. The calculated value is stored in the reference frame means 10.

Then, in case of compressing the picture B, the motion estimate means 6 calculates a difference value between the picture element value of 8×8 block of the current frame and the picture element value of 8×8 block of the past/future frames stored in the reference frame means 10 referenced by the motion searched by the motion search means 4. The calculated difference value is discrete cosine transformed by the DCT means 7, and the transformation result is quantized by the quantization means 8. The quantized data are high efficiency compressed to Haffman variable length codes by the VLC means 9. Since the picture B is not used as the reference frame, decoding of the picture is not required.

As described above, data compression based on the MPEG as International Standards allows for highly efficient compression of moving pictures. Supposing that the compression is executed by using the software, moving search, DCT processing or the like may exert quite a heavy load on the CPU, requiring long processing time for the moving picture compression. For example, 0.13 seconds for YCrCb conversion, 0.52 seconds for motion search, and 0.62 seconds for frame compression, assuming that it takes 1.27 seconds for compressing 1 frame, compression of the 1 minute moving picture requires 2,286 seconds (about 38 minutes), which is obtained by the following equation: 60×30×1.27 sec.=2286 sec (approx. 38 min.).

Since it requires a long time to compress the moving picture, a need to use other program (editing the picture data which have been already compressed) during compression has been demanded by users for more efficient use of the machine as well as to save time. To start other program, the compression has to be suspended in the middle of processing and resumed after executing other program for a predetermined time.

It is considered appropriate to suspend the compression after completing 1 frame compression. However the time length for the 1 frame compression is long, leading to delay in executing other program. The processing time for compression and executing other program is explained referring to FIG. 3a to FIG. 3C.

FIG. 3A shows a length of the time for executing moving picture compression only. FIG. 3B shows a length of the time for editing the moving picture. FIG. 3C is a length of the time for executing moving picture compression and moving picture editing concurrently.

As shown in FIG. 3B, it takes T1 to edit only the moving picture. While it takes T2 to compress and edit the moving picture concurrently which has been added with the processing times for compressing the second frame (C2) and the third frame (C3). Both processing times for the second frame (C2) and the third frame (C3) are several times longer than the total length of times for taking the moving picture data (E1), cutting the moving picture data (E2) and recording the moving picture data (E3), leading to extended time for editing the moving picture.

Accelerating the speed for moving picture compression may solve the aforementioned problem. A method for accelerating the compression by simplifying the compression processing has been proposed. In this method, calculation process requiring high accuracy has to be simplified for acceleration. As a result, the quality of the picture obtained by reproducing the compressed picture image is degraded. Alternatively a plurality of DCT circuits, quantization circuits, VLC circuits or the like are prepared so that a plurality of blocks of the picture image can be concurrently processed for acceleration. This method requires additional hardware, resulting in complicated construction as a whole.

A cache memory accessible at a high speed can be used to accelerate the process and yet maintain a simple construction. The above method is described referring to FIG. 4.

FIG. 4 is a block diagram showing the cache memory accessible at a high speed which is built in the CPU. This construction comprises an external memory 21 in which the program is stored and a Central Processing Unit (referred to as CPU, hereinafter) 22 where calculation is executed in accordance with the stored program.

The CPU 22 comprises a cache memory 23 for temporarily recording the program stored in the external memory 21 during execution, an instruction decoder 24 for decoding every program instruction and a control unit 25 for executing various calculations responding to the decoded instruction. When executing the program, the program data are transferred from the external memory 21 to the cache memory 23 and the program instruction is decoded by the instruction decoder 24. The control unit 25 executes various calculations based on the result.

The cache memory 23 temporarily records the program data stored in the external memory 21. Should the program data which will be executed next be recorded in the cache memory 23, access to the external memory is omitted and the program data are directly transferred from the cache memory 23 to the instruction decoder 24. The speed for accessing the cache memory 23 is faster than that for accessing the external memory 21. So the consecutively repeated program can be executed at a high speed by using the cache memory.

JP-A-141756/1982 discloses a mode for accelerating the program speed by transferring the part of the program recorded in a low-speed memory which is required to be accelerated to a high-speed memory. JP-A-125449/1987 discloses a mode for accelerating a plurality of programs by controlling the cache memory depending on a program type allocated thereto. JP-A-333929/1992 discloses a mode for accelerating the program speed by retaining the loop instruction sequence in the cache memory until the end of the loop. JP-A-108479/1993 discloses a mode for accelerating the program speed by setting the interruption program in the cache memory.

In those related arts, all the programs executed at an accelerated speed have to be stored in the cache memory. Since the moving picture compression is formed of a plurality of processing programs such as YCrCb conversion, motion search, frame compression or the like, the whole program size becomes several hundreds of KB. Therefore the cache memory capacity has to be large enough to store all the programs.

In case a plurality of programs are executed concurrently, a control is required so that the program for compressing the moving picture requiring high-speed processing is set in the cache memory with a priority.

In order to improve the efficiency in executing a plurality of programs concurrently, the timing for suspending compression of the moving picture has to be adjusted conforming to the number of programs under execution. However the moving picture compression needs to have a large amount of calculations which may exert heavier load to the CPU compared with other programs. Therefore the timing for suspending the compression of the moving picture cannot be adjusted well.

SUMMARY OF THE INVENTION

It is an object of the present invention to provide solutions for the aforementioned problems.

It is another object of the present invention to provide an art for compressing the moving picture at a high speed by using a small sized cache memory as well as keeping simple construction. This moving picture compression mode further allows a plurality of programs to be executed concurrently during data compression by adjusting the timing for suspending the processing within a predetermined period.

The objects of the present invention are achieved by a moving picture compression unit for dividing a picture image into small blocks, discrete cosine transforming each of the divided block, quantizing a transformation result, dividing an in-frame code high efficiency coded and a picture image into small blocks, motion searching at each block between a current frame and a past/future frame, calculating a difference value between a block of a current frame and a block of the motion searched frame, discrete cosine transforming the difference value, quantizing the transformation result and compression coding the moving picture based on a high efficiency coded inter-frame code, the moving picture compression unit comprising:

a memory for temporarily storing a program for compression coding the moving picture;

set means for setting at least one of division unit of a number of frames, a number of lines and a number of block lines for dividing compression coding processing based on a capacity of the memory; and moving picture compression means for executing compression coding at every division unit set by the set means.

Furthermore, the object of the present invention is achieved by a method of moving picture compression for dividing a picture image into small blocks, discrete cosine transforming each of the divided block, quantizing a transformation result, dividing an in-frame code high efficiency coded and a picture image into small blocks, motion searching at each block between a current frame and a past/future frame, calculating a difference value between a block of a current frame and a block of the motion searched frame, discrete cosine transforming the difference value, quantizing the transformation result and compression coding the moving picture based on a high efficiency coded inter-frame code, the method comprising steps of:

storing a program for compression coding a moving picture in a memory;

setting at least one of a number of frames, a number of lines and a number of block lines as a division unit for dividing compression coding processing based on an unoccupied capacity of the memory; and compression coding a moving picture at every division unit set in the setting step based on the program stored in the memory.

In the present invention, the program for compressing the moving picture is divided into a plurality of small programs and then executed individually. The size of the required cache memory can be reduced. Each program processing is consecutively repeated. So the program can be set in the cache memory during execution without controlling the cache memory. The present invention allows to adjust the time for suspending the compression by changing the number of repetition of the respective programs. As a result, a plurality of programs can be executed concurrently without degrading the efficiency during compression.

BRIEF DESCRIPTION OF THE DRAWINGS

This and other objects, features and advantages of the present invention will become more apparent upon a reading of the following detailed description and drawings, in which:

FIG. 1A to FIG. 1F are layered structures of format of code based on MPEG;

FIG. 3A to FIG. 3C are figures for showing each length of time required for executing moving picture compression and moving picture editing;

FIG. 7 is a division table showing an example of a division unit;

DESCRIPTION OF THE PREFERRED EMBODIMENTS

Figure 2:
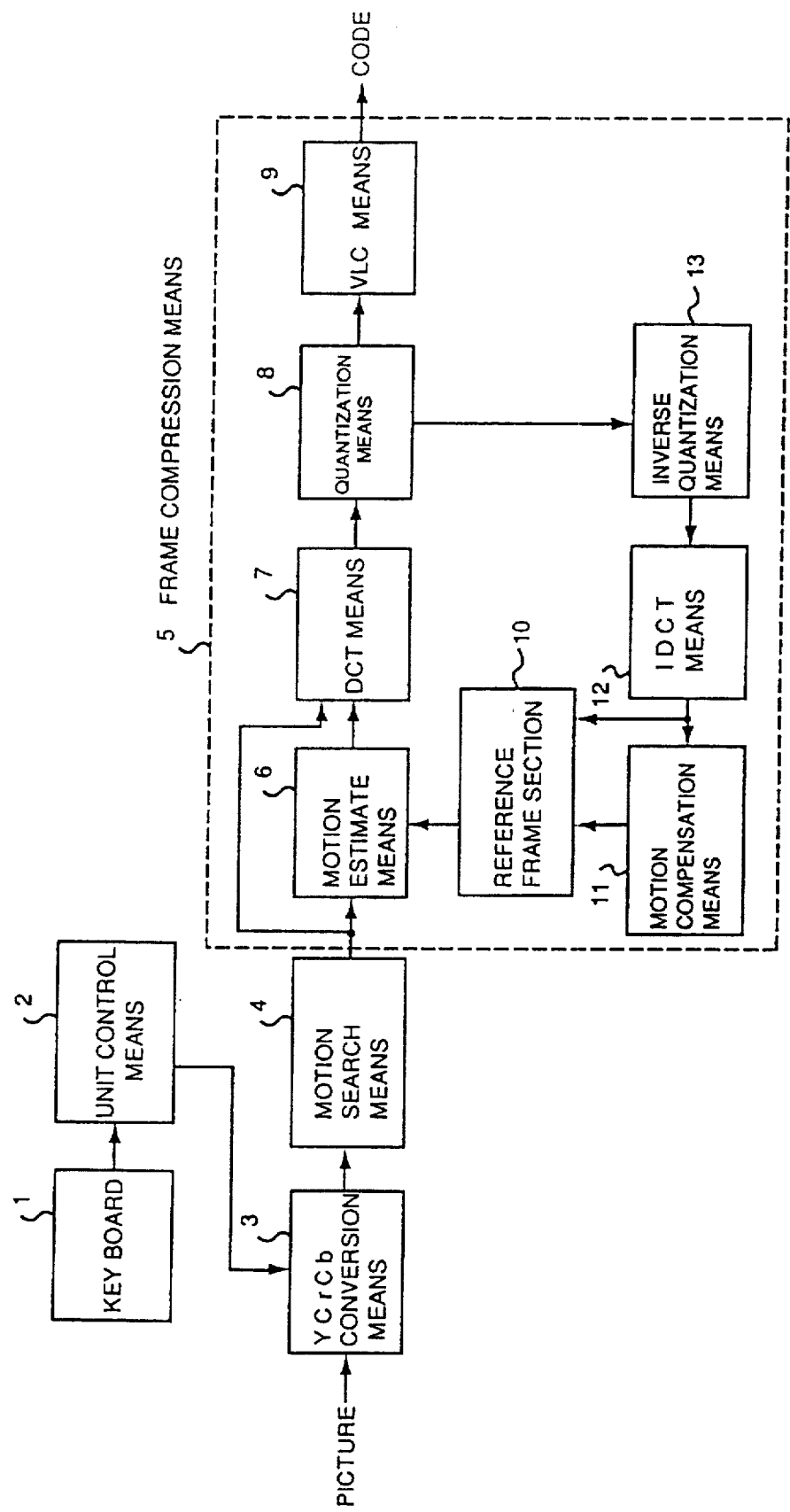
FIG. 2 is a block diagram of a moving picture compression unit for compressing picture code based on MPEG.

An embodiment of the present invention is described referring to the drawings by taking MPEG as an example.

Figure 5:
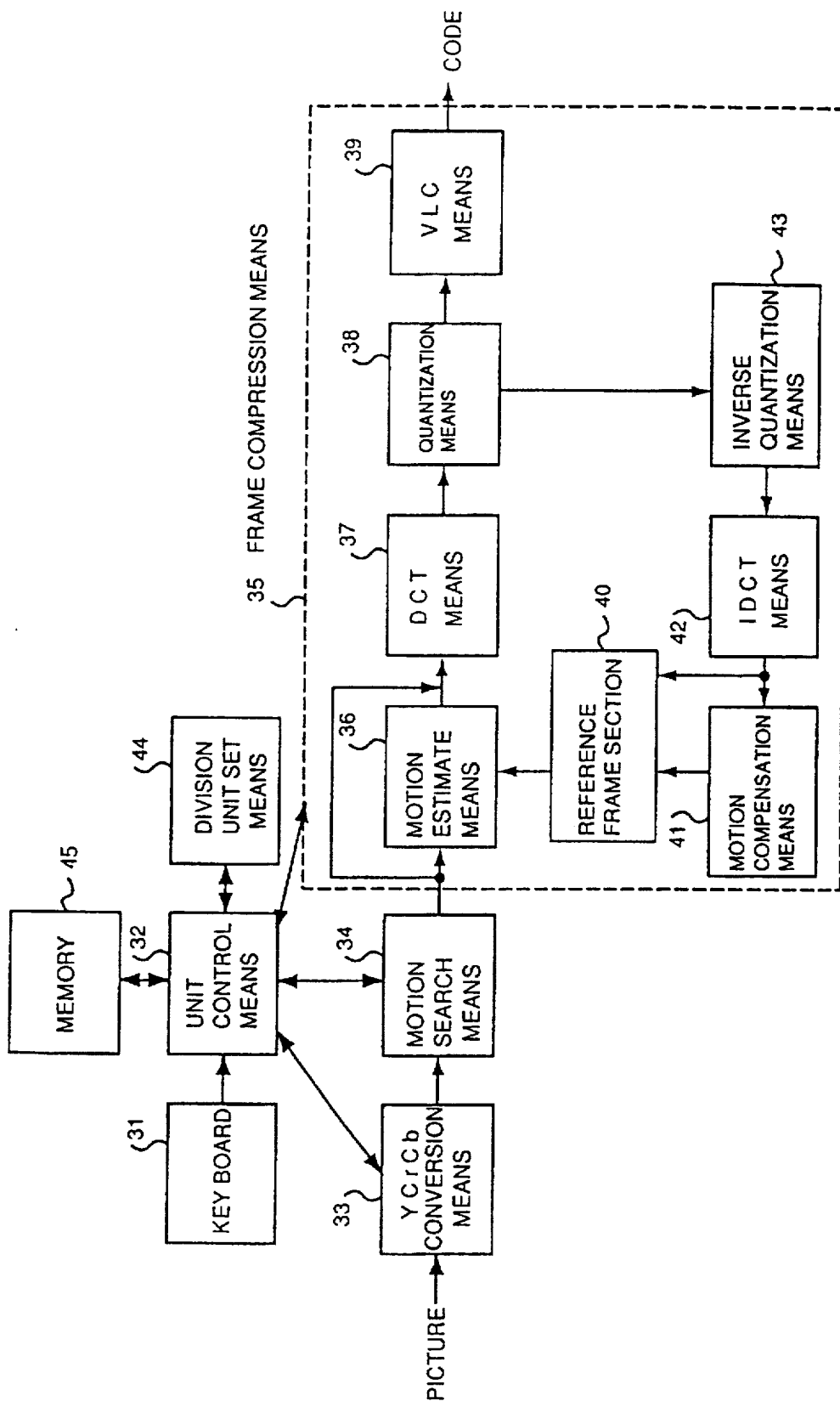
FIG. 5 is a block diagram of a moving picture compression unit of an embodiment of the present invention.

FIG. 5 is a block diagram of a moving picture compression unit as an embodiment of the present invention.

The moving picture compression unit of FIG. 5 comprises a keyboard 31 through which a user inputs commands or the like, unit control means 32 for controlling a whole unit, a YCrCb conversion means 33 for converting the picture image into luminance elements and color difference elements, motion search means 34 for searching each motion of the picture in the past/future frame and current frame at every 8×8 block region, frame compression means 35 for executing 1 frame compression, division set means 44 for setting a division unit for compression, and a memory 45 for storing other programs to edit the moving pictures. The division unit is a unit for suspending compression and a number of processing for frames, lines and block lines.

The frame compression means 35 comprises motion estimate means 36 for calculating a difference between the 8×8 block regions of the past/future frame and the current frame in reference to the motion of the picture image searched by the motion search means 34, DCT means 37 for discrete cosine transformation, quantization means 38 for quantization, VLC means 39 for high efficiency variable length coding.

Furthermore, the frame compression means 35 comprises inverse quantization means 43 for inverse quantization, IDCT means 42 for inverse discrete cosine transformation, motion compensation means 41 for calculating a new reference frame by adding the difference value and the picture element value of the 8×8 block region of the past/future frame and reference frame section 40 for storing the picture image of the referenced past/future frame.

Figure 4:
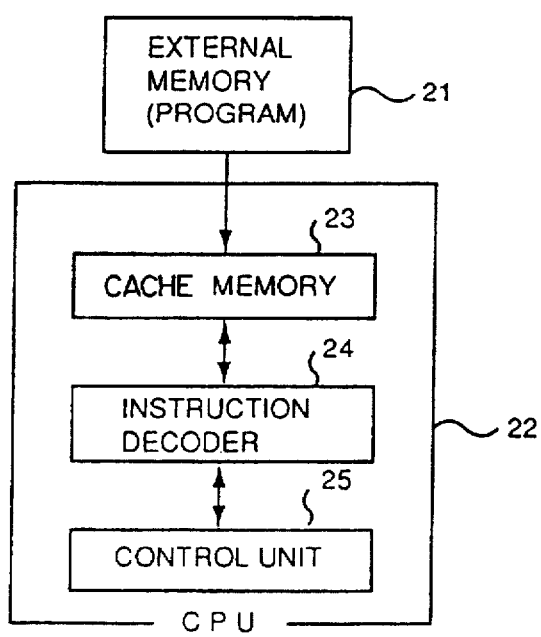
FIG. 4 is a block diagram for explaining how a cache memory functions.

The CPU used in the moving picture compression unit of FIG. 5 has a built-in cache memory as shown in FIG. 4 accessible at a high speed, which executes the consecutively repeated programs at an accelerated speed.

Next, the operations of moving picture compression are explained.

A picture image which has been read out is converted into YCrCb data by the YCrCb conversion means 33. The motion search means 34 searches each picture motion of the past/future frame and the current frame at every 8×8block region. The frame compression means 35 executes compression coding of the data. The MPEG has three types of pictures, a picture I as an in-frame code, a picture P as a forward inter-frame code and a picture B as a bidirectional inter-frame code. The frame compression means 35 executes the above 3 types of compressions.

For compressing the picture I, a picture element value in the 8×8 block region of the current frame is discrete cosine transformed by the DCT means 37 and quantized by the quantization means 38. The data are high efficiency compressed to Huffman variable length codes by the VLC means 39. In order to decode the compressed picture image to a reference frame, the quantized data are inverse quantized by the inverse quantization means 43 and inverse discrete cosine transformed to calculate a picture element value by the IDCT means 42. The resultant picture element value is stored in the reference frame section 40.

For compressing the picture P, a motion estimate means 36 calculates a difference between an picture element value of the 8×8 block region of the current frame and the picture element value of the 8×8 block region of the past frame stored in the reference frame section 40, which is referenced by the motion searched by the motion search means 34. The calculated difference value is discrete cosine transformed by the DCT means 37, quantized by the quantization means 38 and high efficiency compressed to Huffman variable length codes by the VLC means 39. In order to decode the compressed picture image to a reference frame, the quantized data are inverse quantized by the inverse quantization means 43 and inverse discrete cosine transformed to calculate a difference value by the IDCT means 42. Then a motion compensation means 41 adds the difference value to the picture element value of the 8×8 block in the past frame which has been stored in the reference frame section 40 referenced by the motion estimate means 36. The calculated value is stored in the reference frame section 40.

For compressing the picture B, the motion estimate means 36 calculates a difference value between the picture element value of 8×8 block of the current frame and the picture element value of 8×8 block of the past/future frames stored in the reference frame section 40 referenced by the motion searched by the motion search means 34. The calculated difference value is discrete cosine transformed by the DCT means 37, quantized by the quantization means 38 and high efficiency compressed to Huffman variable length codes by the VLC means 39. Since the picture B is not used as the reference frame, decoding of the picture is not required.

According to the number of frames, number of lines and number of block lines set by the division set means 44, the unit control means 32 controls the YCrCb conversion means 33, a motion search means 34 and the frame compression means 35. The word "block lines" means horizontally continuous lines of a macro block.

When execution of other programs stored in the memory 45 is required, the unit control means 32 suspends the compression within a predetermined time and then starts the other program.

Described is the processing of the moving picture compression in the construction described above.

Figure 6:
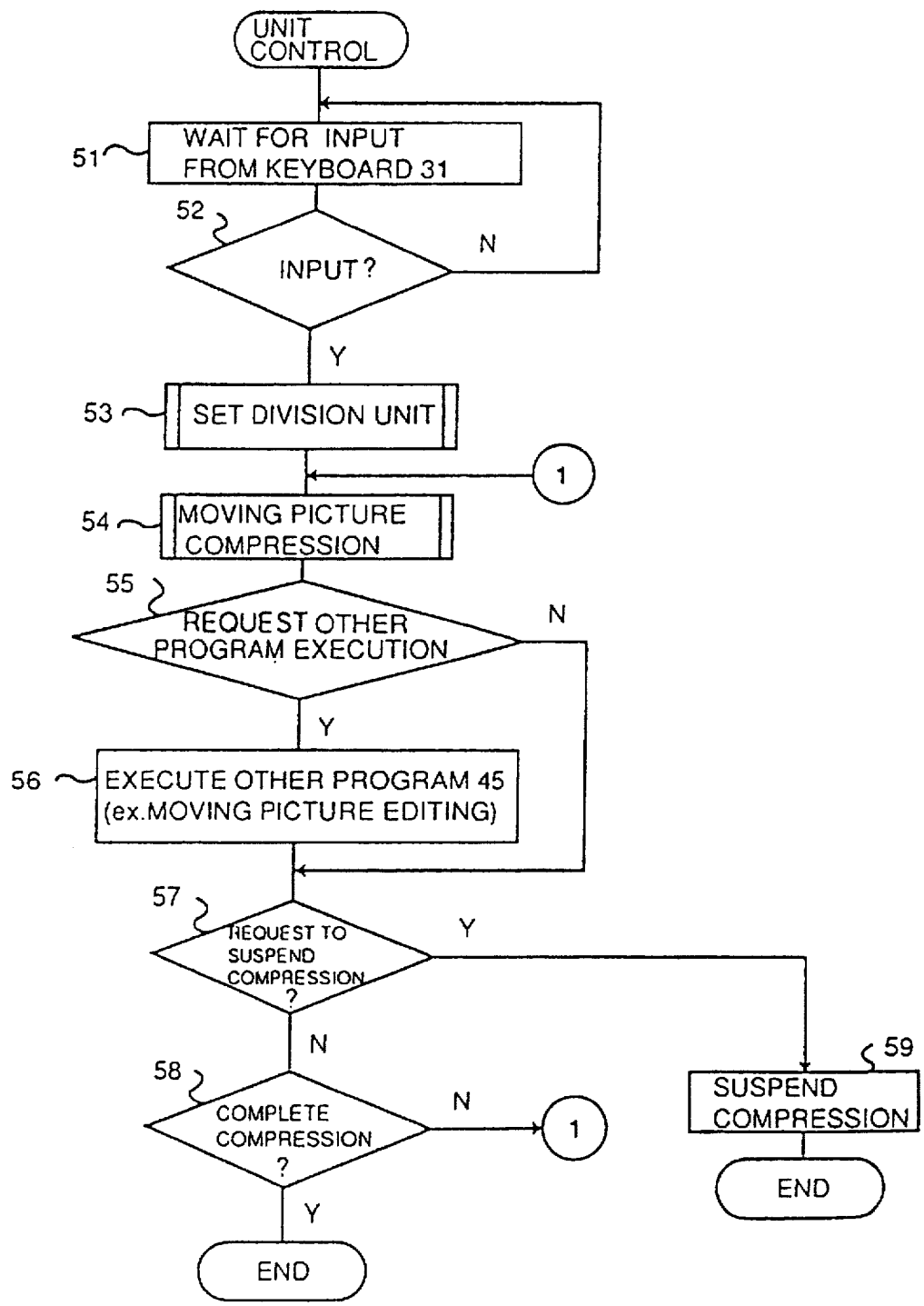
FIG. 6 is a flowchart of an operation of a unit control.

FIG. 6 is a flowchart of processing in the unit control means 32. The unit control of FIG. 6 is ready for receiving an input from the keyboard 31 (step 51) and judges whether or not an input has been received (step 52). If No, the program returns to step 51. If Yes, division unit is set (step 53) and the moving picture is compressed (step 54). It is judged whether or not execution of other program is required (step 55). If No, the program proceeds to step 57. If Yes, other program 45 (for example, editing the moving picture) is executed. Next it is judged whether or not suspension of the compression is required (step 57). If Yes, the compression is suspended (step 59). If No, the program judges whether or not the compression has been completed (step 58). If No, the program returns to step 54. If Yes, the processing is terminated.

In the above-described example of FIG. 6, the division unit is set only once before compressing the moving picture. However the program can be so designed that the division unit is set at every increase/decrease in the number of the programs which have been concurrently executed during the moving picture compression.

It is to be noted that the other program can be executed, suspending compression after completion of processing in a division unit, if suspension of compression is requested.

The moving picture compression can be suspended within a predetermined period according to the number of frames, number of lines and number of block lines defined by the division unit setting. As a result, the moving picture can be compressed along with execution of a plurality of programs without deteriorating operation efficiency thereof.

Figure 12:
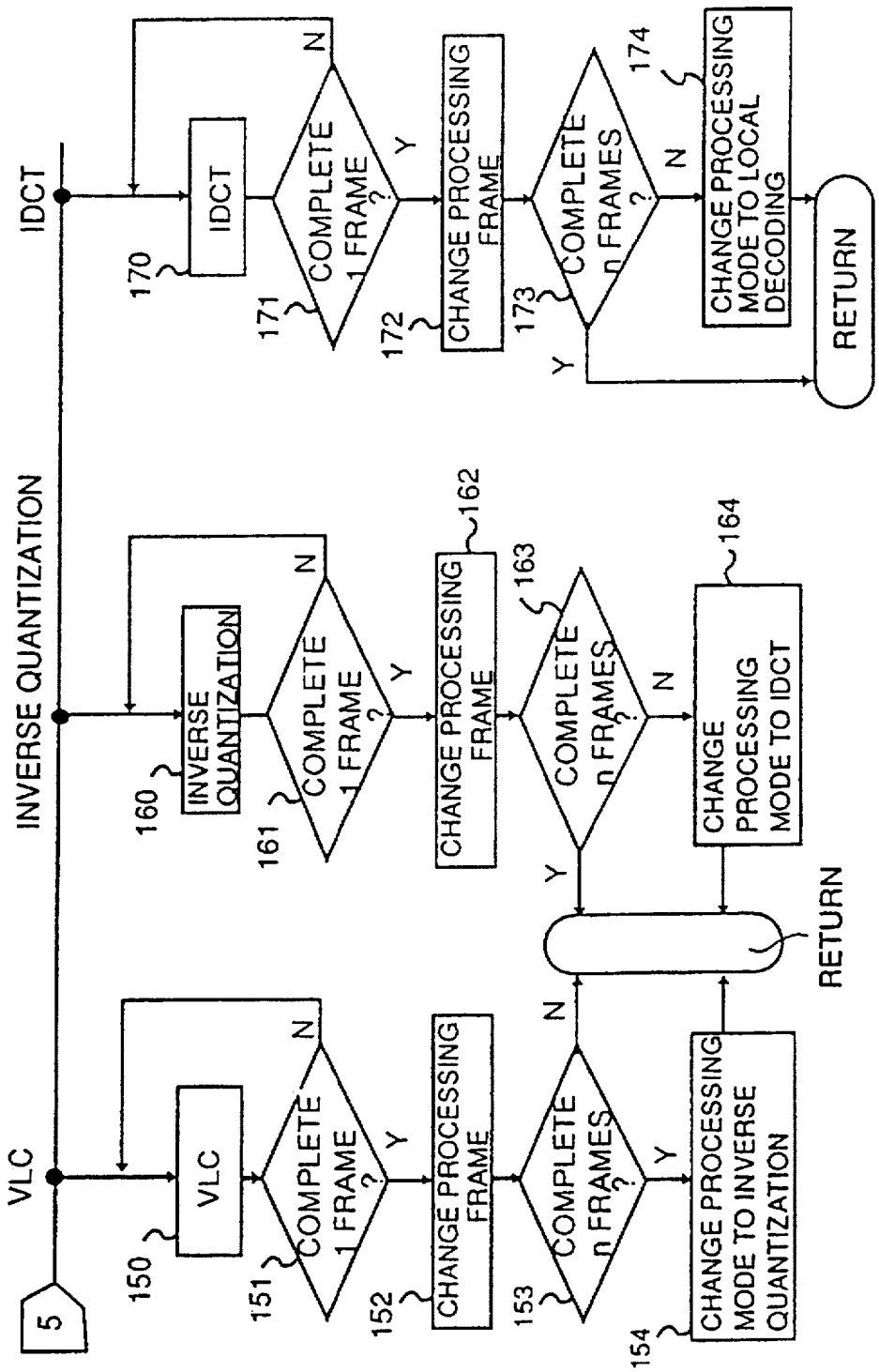
FIG. 12 is a flowchart of a frame compression processing of another frame compression processing as shown in FIG. 9.

FIG. 7 shows a division table showing an example of the division unit used in the division unit set means. The division table of FIG. 12 is formed of the number of line as the division unit of YCrCb conversion for every program under execution, the number of line of the macro block as the division unit of the motion searching and the number of macro block line as the division unit of the frame compression. The division unit value is an optimum value defined by the performance of the compression unit such as the processing speed, memory capacity or the like.

Figure 8:
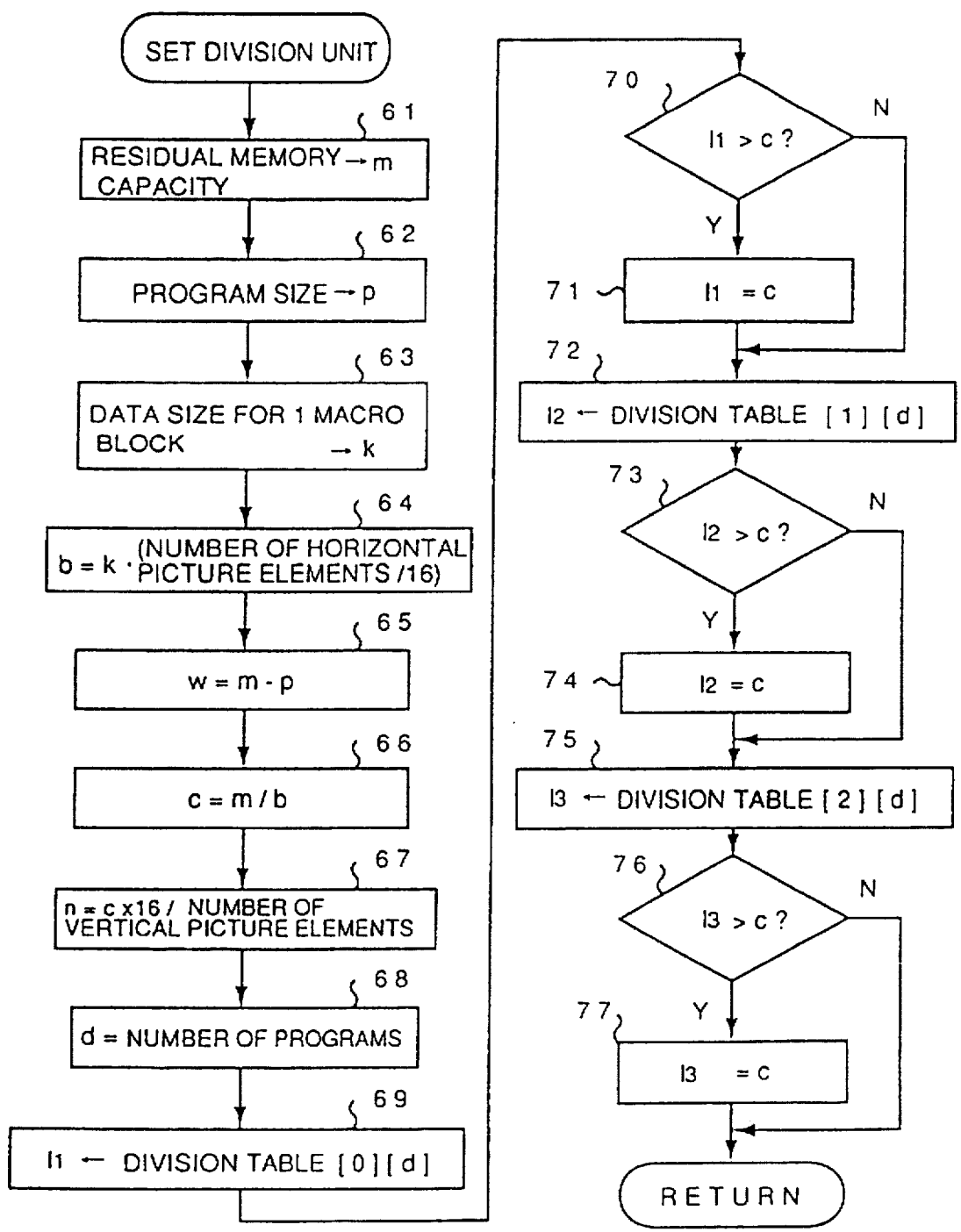
FIG. 8 is a flowchart of a moving picture compression processing.

FIG. 8 is a flowchart of processing in division unit set means 44. The division unit setting sets a value of the number of frame (variable n) as a division unit of compression, a value of the number of line (variable $l_1$) as the division unit of YCrCb conversion, a value of the number of block line (variable $l_2$) as the division unit of motion searching and a value of the number of block line (variable $l_3$) as the division unit of frame compression so that the moving picture compression is suspended within a predetermined period.

First, the residual memory capacity is checked and the value of the residual memory capacity is stored as the variable m (step 61).

The program size for the moving picture compression is checked and the value of the program size is stored as the variable p (step 62).

Next, the data size (8×8×6×2) for 1 macro block is calculated and stores the calculated value as the variable k (step 63).

The data size (k×(the number of horizontal picture elements/16) for 1 block line is calculated and the calculated value is stored as the variable b (step 64).

The memory size (m–p) available during the moving picture compression is calculated and the calculated value is stored as the variable w (step 65).

The number of lines (w/b) of available macro block is calculated and the calculated value is stored as a variable c (step 66).

The number of frames (c/(vertical picture elements/16)) of available data is calculated and the calculated value is stored as a variable n (step 67).

The number of programs under execution is confirmed and the number is stored as a variable d (step 68).

The division unit, that is a number of lines (division table [0][d])×[0] is an index) for YCrCb conversion is set arbitrarily and stored as the variable $l_1$ (step 69).

It is judged whether or not the value of the variable $l_1$ is larger than the value of the variable c (step 70).

If No, the program proceeds to step 72. If Yes, the value of the variable c is stored as the variable $l_1$ (step 71).

Next, the number of macro block lines (division table [1][d]), that is the division unit for the motion search is set arbitrarily and stored as the variable $l_2$ (step 72). It is judged whether or not the value of the variable $l_2$ is larger than the value of the variable c (step 73). If No, the program proceeds to step 75. If Yes, the value of the variable c is stored as the variable $l_2$ (step 74).

Then, the number of macro block lines (division table [2][d]), that is the division unit for the frame compression is set arbitrarily and stored as the variable $l_3$ (step 75). It is judged whether or not the value of the variable $l_3$ is larger than the value of the variable c (step 76). If No, the processing is terminated. If Yes, the value of the variable c is stored as the variable $l_3$ (step 77).

The residual memory capacity and the number of programs under execution are used for defining an optimum division unit. Therefore compression can be executed along with concurrent execution of a plurality of programs without deteriorating the operation efficiency thereof.

In the above example, it is supposed that the number of lines and the number of block lines are the same, because the difference between the number of lines and the number of block lines is small, for example it may be plus or minus a few lines. Needless to say, the numbers of lines and block lines can be set strictly.

Figure 9:
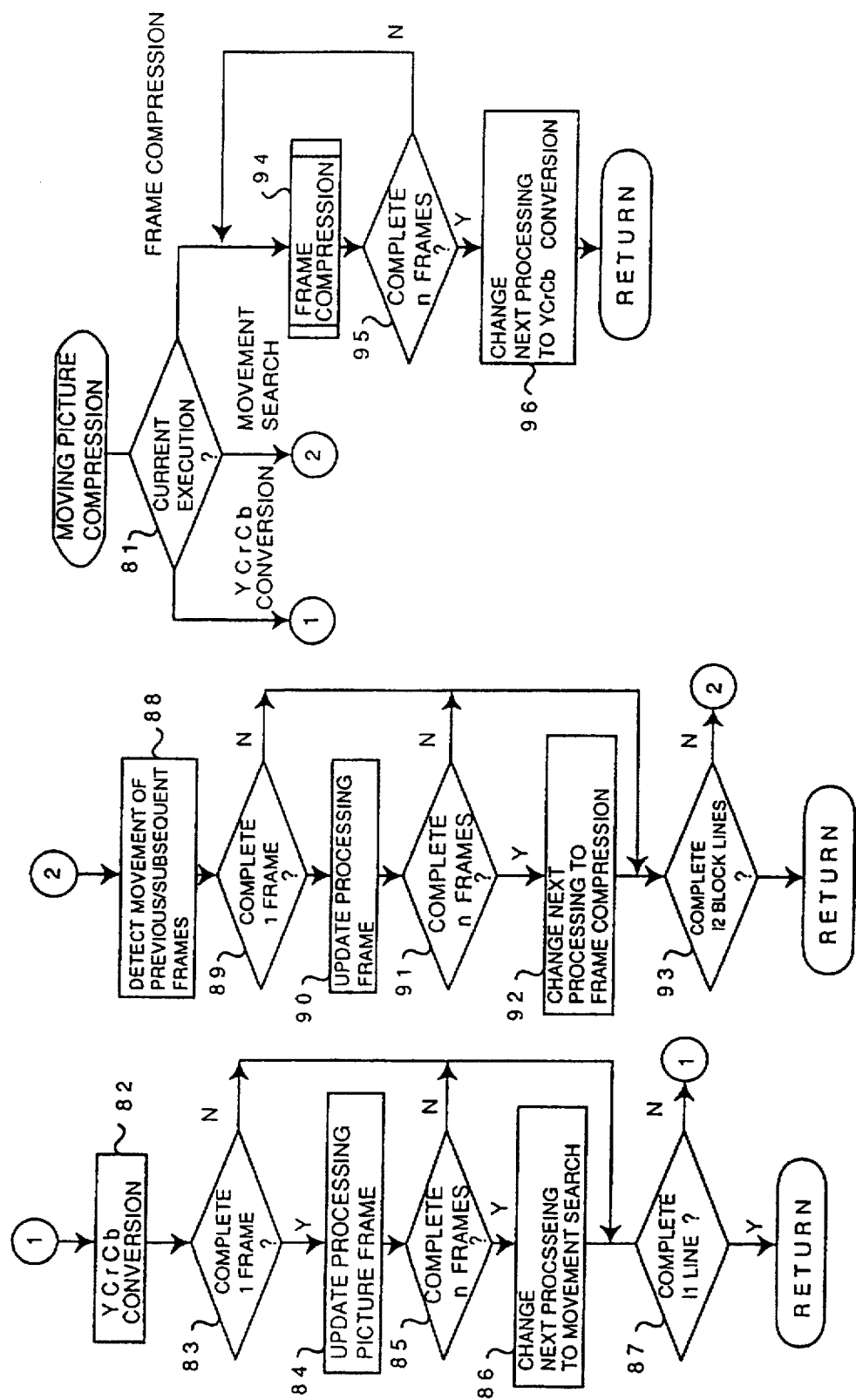
FIG. 9 is a flowchart of a frame compression processing.

FIG. 9 is a flowchart of processing in the moving picture compression.

First, current processing is checked.(step 81). If it is determined that the YCrCb conversion is executed, a picture image is converted into luminance element Y and color difference elements Cr and Cb data for 1 line by the YCrCb conversion means 33 (step 82). It is judged whether or not 1 frame has been completed (step 83). If No, the program proceeds to step 87. If Yes, the frame of the processing picture is updated (step 84).

Next, it is judged whether or not n frames have been completed (step 85). If No, the program proceeds to step 87. If Yes, the program selects the next processing as the motion search (step 86).

Then, it is judged whether or not $l_1$ lines have been completed (step 87). If Yes, the program returns to step 81. If No, the program returns to step 82.

During processing of the motion search, the motion of the past/future frame of the picture image is obtained by the motion search means 34 (step 88). It is judged whether or not 1 frame has been completed (step 89). If No, the program proceeds to step 93. If Yes, the frame of the processing picture is updated (step 90). It is judged whether or not n frames have been completed (step 91). If No, the program proceeds to step 93. If Yes, the program selects the next processing as the motion search (step 92). It is judged whether or not $l_2$ block lines have been completed (step 93). If No, the program returns to step 88. If Yes, the program returns to step 81.

In the processing of the frame compression, the frame is compressed (step 94). It is judged whether or not n frames have been completed (step 95). If No, the processing is continued. If Yes, the program selects the next processing as YCrCb conversion (step 96).

The moving picture compression is executed by processing YCrCb conversion, motion search and frame compression individually, which can be suspended within a short period. Each processing is repeated for several frames. The program for each processing is set in the cache memory during execution, resulting in high-speed processing. The program size of the divided processing can be decreased, thus reducing the required cache memory size.

Figure 10:
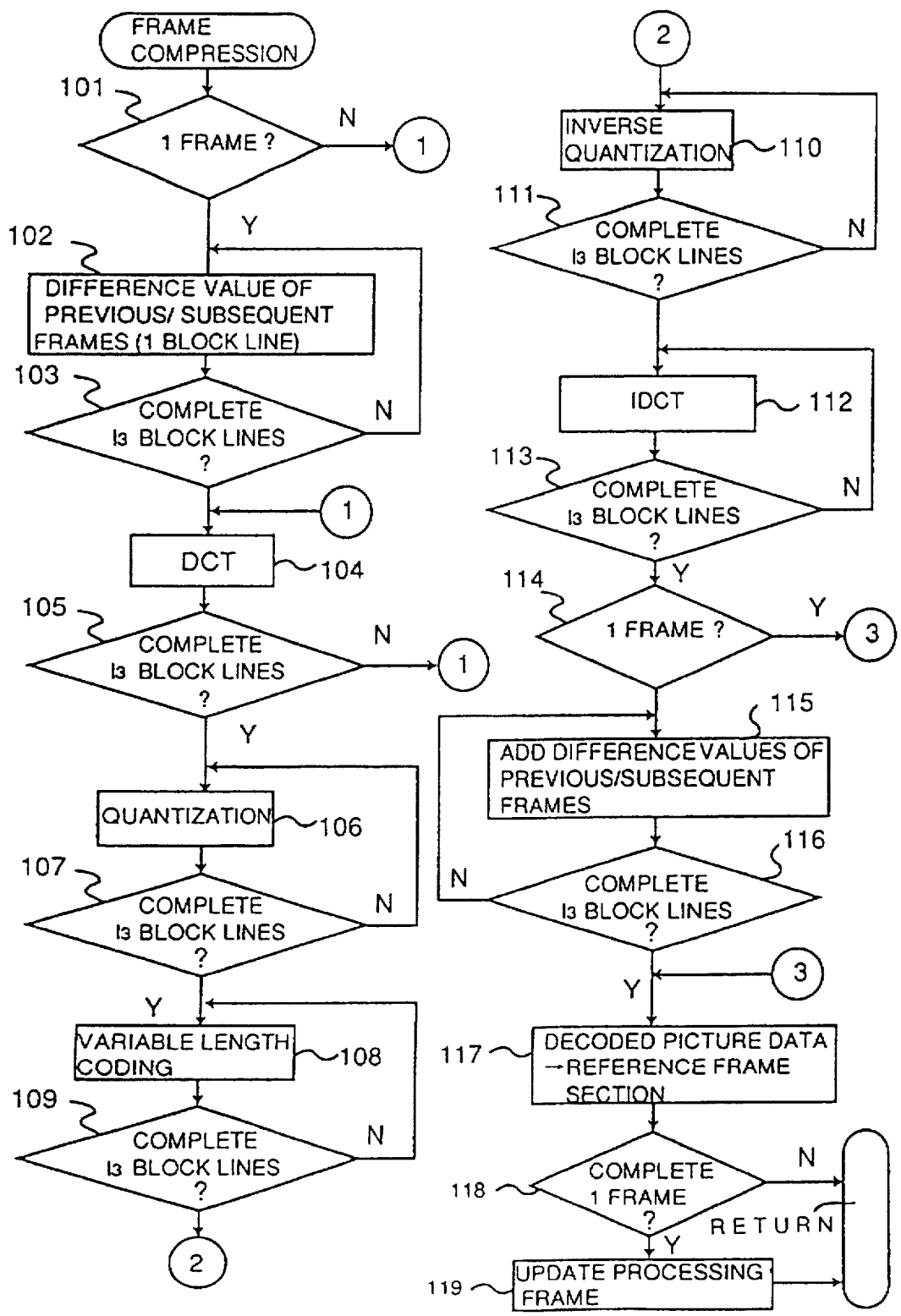
FIG. 10 is a flowchart of a frame compression processing of another frame compression processing as shown in FIG. 9.

FIG. 10 is a flowchart of processing in the frame compression means 35. The program shown in FIG. 10 judges whether or not the inter-frame compression is executed (step 101). If No, the program proceeds to step 104. If Yes, a difference between values of the past and future frames stored in the reference frame section 40 is calculated for 1 block line (step 102). It is judged whether or not $l_3$ block lines have been completed (step 103). If No, the program returns to step 102. If Yes, the DCT is executed for 1 block line by the DCT means 37 (step 104). It is judged whether or not $l_3$ block lines have been completed (step 105). If No, the program returns to step 104. If Yes, the quantization is executed by the quantization means 38 for 1 block line (step 106). It is judged whether or not $l_3$ block lines have been completed (step 107). If No, the program returns to step 106.

If Yes, the variable length coding is executed for 1 block line by the VLC means 39 (step 108). It is judged whether or not the $l_3$ block lines have been completed (step 109). If No, the program returns to step 108. If Yes, inverse quantization is executed for 1 block line by the inverse quantization means 43 (step 110). It is judged whether or not $l_3$ block lines have been completed (step 111). If No, the program returns to step 110. If Yes, the IDCT is executed for 1 block line by the IDCT means 42 (step 112). It is judged whether or not the $l_3$ block line has been completed (step 113). If No, the program returns to step 112. If Yes, it is judged whether or not the inter-frame compression is executed (step 114). If No, the program proceeds to step 117. If Yes, the difference value of the past/future frame stored in the reference block section 40 is added for 1 block line by the motion compensation means 41 (step 115). It is judged whether or not $l_3$ block lines have been completed (step 116). If No, the program returns to step 115. If Yes, the decoded picture image for $l_3$ block lines is stored in the reference frame section 40 (step 117).

Next, it is judged whether or not one frame has been completed (step 118). If No, the program returns to original point. If Yes, the processing frame is updated (step 119).

The frame compression is controlled by a unit of block line, which can be suspended within a short period. The frame is compressed by executing processing of motion estimate, DCT, quantization, variable length coding, inverse quantization, IDCT and motion compensation individually and repeatedly for several block lines. Each program of processing can be set in the cache memory during execution, resulting in high-speed processing. The program size of each divided processing can be decreased, leading to reduced size of the required cache memory.

Figure 11:
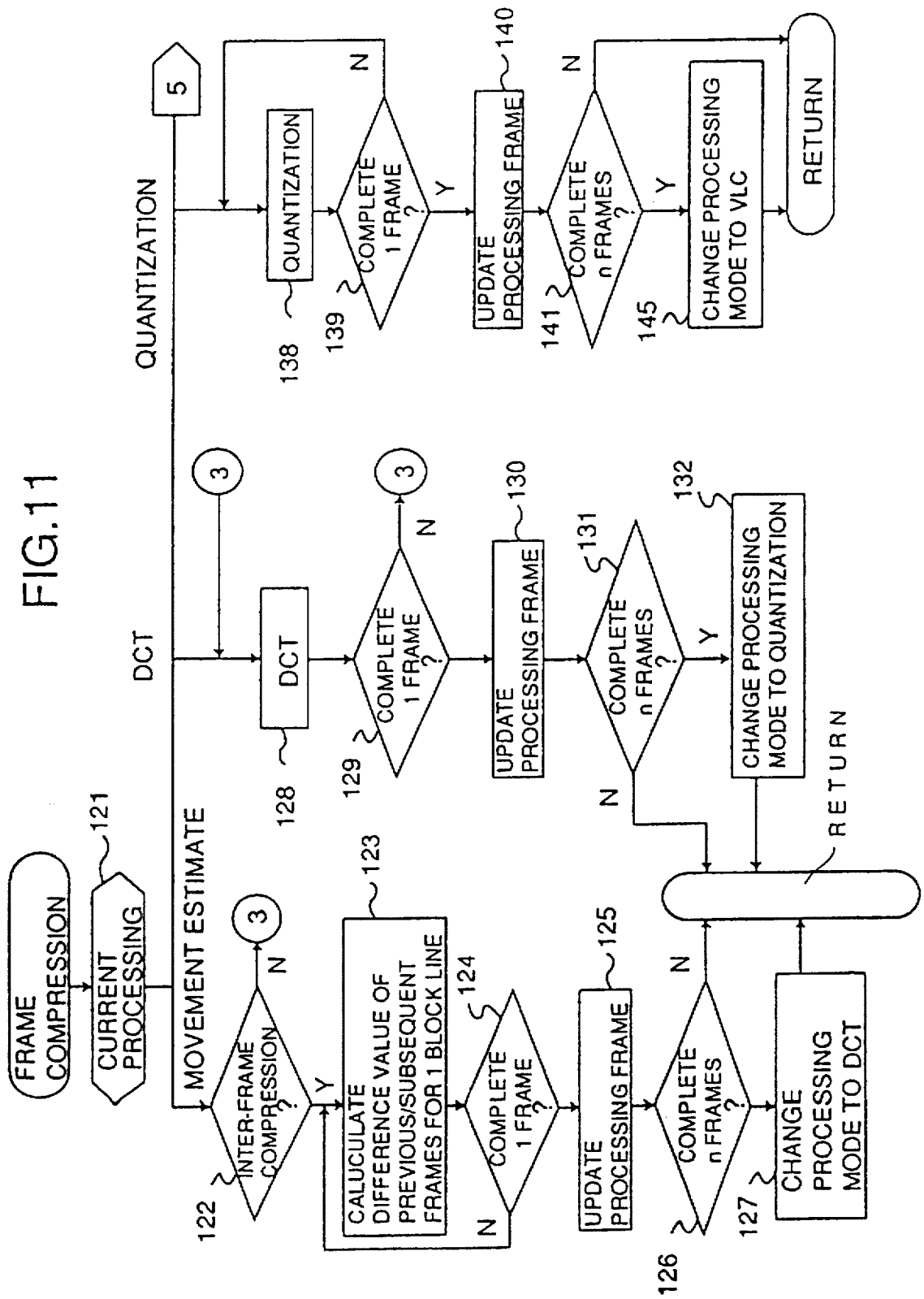
FIG. 11 is a flowchart of a frame compression processing of another frame compression processing as shown in FIG. 9.
Figure 13:
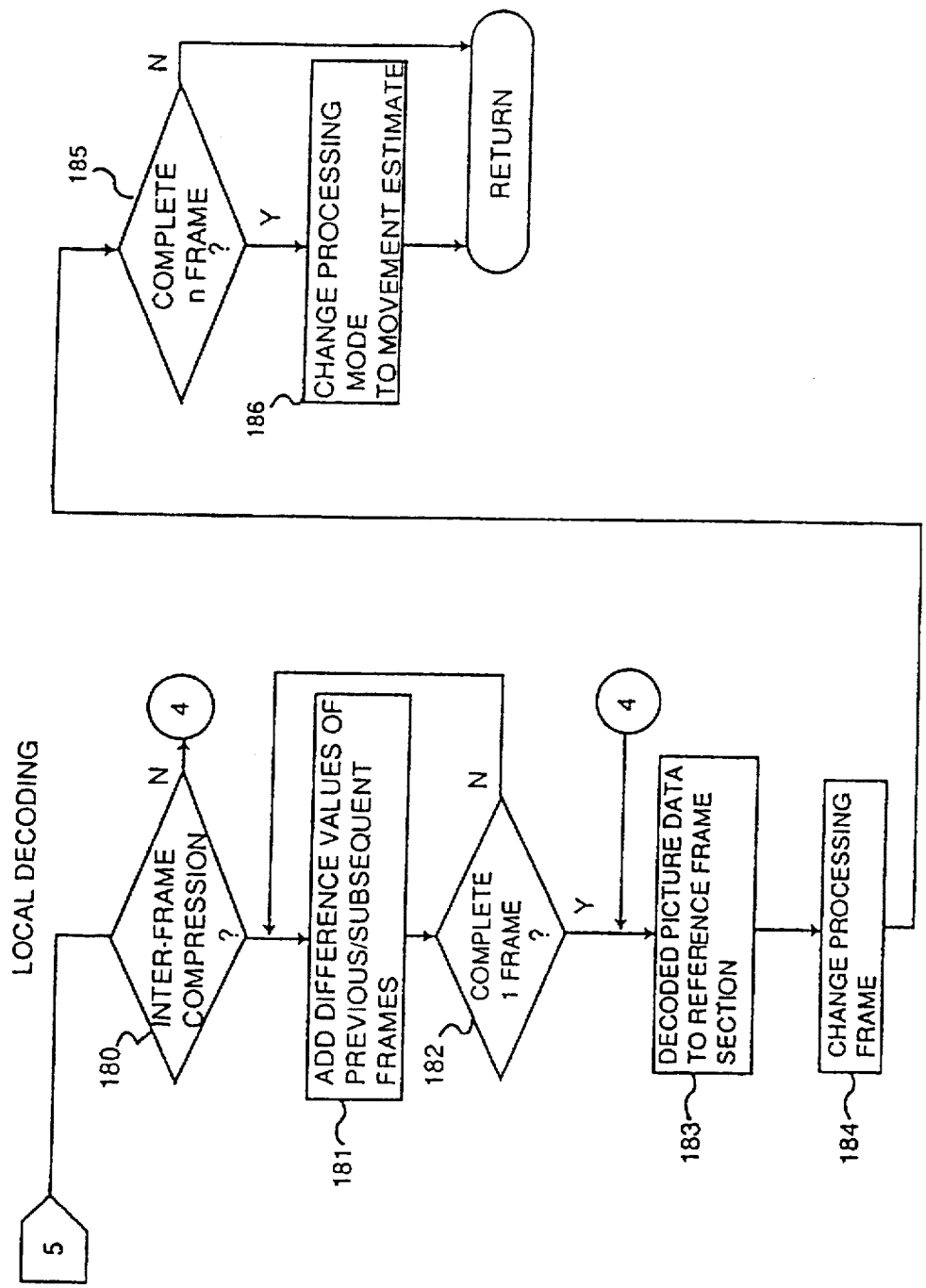
FIG. 13 is a flowchart of a frame compression processing of another frame compression processing as shown in FIG. 9.

FIG. 11, FIG. 12 and FIG. 13 show each flowchart of the frame compression means 35 of another mode. In the frame compression process, it is judged as to which processing is currently executed (step 121). If the motion estimate has been executed, it is judged whether or not the inter-frame compression is executed (step 122). If No, the program proceeds to step 128. If Yes, a difference value between past and future frames stored in the reference frame section 40 is calculated by the motion estimate means 36 for 1 block line (step 123). It is judged whether or not 1 frame has been completed (step 124). If No, the program returns to step 123. If Yes, the frame for processing the picture image is updated (step 125). It is judged whether or not n frames have been completed (step 126). If No, the program returns to step 121. If Yes, the program selects the next processing as DCT (step 127).

If it is determined that the DCT is currently executed at step 121, the DCT is executed for 1 block line by the DCT means 37 (step 128). It is judged whether or not 1 frame has been completed (step 129). The frame for processing picture image is updated (step 130). It is further judged whether or not n frames have been completed (step 131). If No, the processing is terminated. If Yes, the program selects the next processing as quantization (step 132).

If it is determined that the quantization is currently executed at step 121, quantization is executed for 1 block line by the quantization means 38 (step 138). It is judged whether or not 1 frame has been completed (step 139). The frame of the processing picture is updated (step 140). It is judged whether or not n frames have been completed (step 141). If No, the program returns to step 121. If Yes, the program selects the next processing as VLC (step 145).

If it is determined that the VLC is currently executed at step 121, the variable length coding is executed for 1 block line by the VLC means 39 (step 150). It is judged whether or not 1 frame has been completed (step 151). The frame of the processing picture is updated (step 152). It is judged whether or not n frames have been completed (step 153). If No, the program returns to step 121. If Yes, the program selects the next processing as inverse quantization (step 154).

If it is determined that the inverse quantization is currently executed at step 121, inverse quantization is executed for 1 block line by the inverse quantization means 43 (step 160). It is judged whether or not 1 frame has been completed (step 161). The frame of the processing picture is updated (step 162). It is judged whether or not n frames have been completed (step 163). If No, the program returns to step 121. If Yes, the program selects the next processing as IDCT (step 164).

If the determination result in step 121 is the IDCT is currently executed, IDCT is executed for 1 block line by the IDCT means 42 (step 170). It is judged whether or not 1 frame has been completed (step 171). The frame of the processing picture is updated (step 172). It is judged whether or not n frames have been completed (step 173). If No, the program returns to step 121. If Yes, the program selects the next processing as IDCT (step 174).

If it is determined that local decoding is currently executed at step 121, it is judged whether or not inter-frame compression is executed (step 180). If No, the program proceeds to step 183. If Yes, the difference value of the past/future frames stored in the reference frame section 40 is added for 1 block line by the motion compensation means 41 (step 181). It is judged whether or not 1 frame has been completed.(step 182). If No, the program returns to step 181. If Yes, the decoded picture data for 1 frame is stored in the reference frame section 40 (step 183). The frame of the processing picture is updated (step 184). It is judged whether or not n frames have been completed (step 185). If No, the program returns to step 121. If Yes, the program selects the next processing as the motion estimate (step 186).

The frame is compressed by executing a series of divided processing of motion estimate, DCT, quantization, variable length coding, inverse quantization, IDCT and local decoding, which can be suspended within a short period. Each processing is repeated for several frames. As a result, the program of each processing can be set in the cache memory during execution, resulting in high-speed processing. The program size for each of divided processing can be decreased, thus reducing the required cache memory size.

What is claimed is:

1. A moving picture compression unit for compression coding, using a program comprising a plurality of smaller sized programs, a moving picture based on an in-frame code and an inter-frame code, where said in-frame code is high efficiency coded through dividing a picture image into small blocks, discrete cosine transforming each of said divided blocks, quantizing a transformation result, and where said inter-frame code is high efficiency coded through dividing a picture image into small blocks, motion searching at each block between a current frame and a past/future frames, calculating a difference value between a block of a current frame and a block of said motion searched frame, discrete cosine transforming said difference value, quantizing said transformation result, said moving picture compression unit comprising:

a cache memory for temporarily storing one of the smaller sized programs for compression coding said moving picture;

set means for setting at least one of division unit of a number of frames, a number of lines and a number of block lines for dividing compression coding processing based on a capacity of said cache memory; and moving picture compression means for executing compression coding at every division unit set by said set means using the one program stored in said cache memory.

2. The moving picture compression unit of claim 1, wherein said moving picture compression means comprises:

conversion means for converting a picture image of a set division unit into a luminance element and a color difference element and suspending a conversion processing when said division unit of processing has been completed;

motion search means for searching a motion of a picture image in a set division unit of frame when said conversion means has suspended processing and suspending motion search processing when said division unit of processing has been completed; and frame compression means for compressing a frame of a set division unit when said motion search means has suspended processing and suspending processing when said division unit of processing has been completed.

3. The moving picture compression unit of claim 2, wherein said conversion means converts a picture image into a luminance element and a color difference element for at least one of division unit of said set number of frames and said set number of lines.

4. The moving picture compression unit of claim 2, wherein said motion search means searches a motion of a frame picture image for at least one of division unit of said set number of frames and said set number of block lines.

5. The moving picture compression unit of claim 2, wherein said frame compression means compresses a frame for at least one of division unit of said set number of frames and said set number of block lines.

6. The moving picture compression unit of claim 5, wherein said frame compression means comprises:

motion predicting means for calculating a difference value of a block area between a current frame and a past/future frame for at least one of division unit of said set number of frames and said set number of block lines and suspending processing when said division unit of processing has been completed;

discrete cosine transformation means for discrete cosine transforming said difference value for said division unit when said motion predicting means has suspended processing and suspending processing when said division unit of processing has been completed;

quantization means for quantizing a result of discrete cosine transformation for said division unit when said discrete cosine transformation means has suspended processing and suspending processing when said division unit of processing has been completed; and coding means for coding a result of said quantization into a variable length code for said division unit when said quantization means has suspended processing and suspending processing when said division unit of processing has been completed.

7. A moving picture compression unit for compression coding, using a coding program comprising a plurality of smaller sized programs, a moving picture based on an in-frame code and an inter-frame code, where said in-frame code is high efficiency coded through dividing a picture image into small blocks, discrete cosine transforming each of said divided blocks, quantizing a transformation result, and where said inter-frame code is high efficiency coded through dividing a picture image into small blocks, motion searching at each block between a current frame and a past/future frames, calculating a difference value between a block of a current frame and a block of said motion searched frame, discrete cosine transforming said difference value, quantizing said transformation result, said moving picture compression unit comprising:

- a cache memory for storing one of the smaller sized programs for compression coding said moving picture;
- set means for setting at least one of division unit of a number of frames, a number of lines and number of block lines for dividing compression coding processing based on an unoccupied capacity of said cache memory; and
- moving picture compression means for executing compression coding processing at every division unit set by said set means based on the one program stored in said cache memory and suspending processing succeeding to completion of said division unit of compression coding when a request for executing other instructions is issued.

8. The moving picture compression unit of claim 7, wherein said moving picture compression means comprises:

- conversion means for converting a picture image of a set division unit into a luminance element and a color difference element and suspending processing when said division unit of processing has been completed;
- motion search means for searching a motion of a frame picture of a set division unit said conversion means has suspended processing and suspending processing when said division unit of processing has been completed; and
- frame compression means for compressing a frame of a set division unit when said motion search means has suspended processing and suspending processing when said division unit of processing has been completed.

9. The moving picture compression unit of claim 8, wherein said conversion means converts a picture image into a luminance element and a color difference element for at least one of division unit of said set number of frames and a set number of lines.

10. The moving picture compression unit of claim 8, wherein said motion search means searches a motion of a frame picture image for at least one of a division unit of said set number of frames and said set number of lines.

11. The moving picture compression unit of claim 8, wherein said frame compression means compresses a frame for at least one of said set number of frames and said set number of block lines.

12. The moving picture compression unit of claim 11, wherein said frame compression means comprises:

- motion predicting means for calculating a difference value of a block area between a current frame and a past/future frame for at least one of division unit of said set number of frames and said set number of block lines and suspending processing when said division unit of processing has been completed;
- discrete cosine transformation means for discrete cosine transforming said difference value for said division unit when said motion predicting means has suspended processing and suspending processing when said division unit of processing has been completed;
- quantization means for quantizing a result of said discrete cosine transformation for said division unit when said discrete cosine transformation means has suspended processing and suspending processing when said division unit of processing has been completed; and
- coding means for coding a result of quantization into a variable length code when said quantization means has suspended processing and suspending processing when said division unit of processing has been completed.

13. A method of moving picture compression for compression coding, using a coding program comprising a plurality of smaller sized programs, a moving picture based on an in-frame code and an inter-frame code, where said in-frame code is high efficiency coded through dividing a picture image into small blocks, discrete cosine transforming each of said divided blocks, quantizing a transformation result, and where said inter-frame code is high efficiency coded through dividing a picture image into small blocks, motion searching at each block between a current frame and a past/future frames, calculating a difference value between a block of a current frame and a block of said motion searched frame, discrete cosine transforming said difference value, quantizing said transformation result, said method comprising steps of:

- storing one of the smaller sized programs for compression coding the moving picture in a cache memory;
- setting at least one of a number of frames, a number of lines and a number of block lines as a division unit for dividing compression coding processing based on an unoccupied capacity of said cache memory;
- compression coding the moving picture at every division unit set in said setting step based on the one program stored in said cache memory; and
- erasing the portion of the one program stored in said cache memory and storing another portion of the program after completing said division unit of compression coding when a request for executing other instructions is issued.

14. The moving picture compression method of claim 13, wherein said storing step comprises a step of dividing processing of said compression coding step into a plurality of processing steps, storing a program corresponding to one of said divided plurality of processing steps in a memory and storing a program corresponding to the next processing step when processing of a stored program has been completed, and said compression coding step comprises a step of processing for a set division unit of a program stored in said memory.

15. The moving picture compression method of claim 13, further comprising a step of suspending compression coding processing after said division unit of compression coding processing has been completed, when receiving a request for executing an instruction issued by a program other than compression coding program of a moving picture, and executing said instruction.

16. A method of moving picture compression for compression coding a moving picture based on an in-frame code and an inter-frame code, where said in-frame code is high efficiency coded through dividing a picture image into small blocks, discrete cosine transforming each of said divided blocks, quantizing a transformation result and said inter-frame code is high efficiency coded through dividing a picture image into small blocks, motion searching at each block between a current frame and a past/future frames, calculating a difference value between a block of a current frame and a block of said motion searched frame, discrete cosine transforming said difference value, quantizing said transformation result, said method comprising steps of:

(A) step of setting at least one of a number of frames, a number of lines and a number of block lines as a number of processing at every processing corresponding to each program based on an unoccupied capacity of a cache memory when programs for converting a picture image into a luminance element and a color difference element, searching a motion of said picture image and compressing a frame is stored in said cache memory;

(B) step of erasing a stored program from said cache memory and storing a program for converting said picture image into a luminance element and a color difference element in said cache memory;

(C) step of converting a picture image into a luminance element and a color difference element for a set number of processing based on a program stored in said cache memory;

(D) step of erasing a stored program from said cache memory after completion of processing of said conversion step and storing a program for searching a motion of said picture image in said cache memory;

(E) step of searching a motion of a picture image for a set number of processing based on a program stored in said cache memory;

(F) step of erasing a stored program from said cache memory after completion of processing of said motion search step and storing a program for compressing said frame in said cache memory;

(G) step of compressing a frame for a set number of processing based on a program stored in said cache memory; and (H) step of executing steps of (B) to (G) repeatedly.

17. The moving picture compression method of claim 16, wherein said frame compression step is divided into:

a motion predicting step of calculating a difference value of a block area between a current frame and a past/future frame;

a discrete cosine transformation step of discrete cosine transforming said difference value;

a quantization step of quantizing a result of said discrete cosine transformation; and a coding step of coding said quantization result into a variable length code, and processing for a number of processing set at every step is executed.

18. The moving picture compression method of claim 16, further comprising a step of suspending processing of compression coding after said division unit of compression coding processing has been completed when a request for executing an instruction issued by a program other than compression coding program of a moving picture, and executing said instruction.

* * * * *